(12) United States Patent
Villien et al.

(10) Patent No.: US 8,750,346 B2
(45) Date of Patent: Jun. 10, 2014

(54) METHOD FOR INTEGRATING SIGNALS TRANSMITTED FROM A TRANSMITTER TO AT LEAST ONE ULTRA WIDE BAND (UWB) RECEIVER AS WELL AS DEVICE FOR THE IMPLEMENTATION OF THE METHOD

(75) Inventors: Christophe Villien, Seyssinet-Pariset (FR); Norbert Daniele, Bernin (FR)

(73) Assignee: Commissariat à L'Ènergie Atomique et aux Ènergies Alternatives, Paris (FR)

( * ) Notice: Subject to any disclaimer, the term of this patent is extended or adjusted under 35 U.S.C. 154(b) by 0 days.

(21) Appl. No.: 13/437,387

(22) Filed: Apr. 2, 2012

(65) Prior Publication Data

US 2013/0022079 A1  Jan. 24, 2013

(30) Foreign Application Priority Data

Apr. 1, 2011 (FR) ...................... 11 52844

(51) Int. Cl.
*H04B 1/30* (2006.01)
(52) U.S. Cl.
USPC ............. 375/130; 375/316; 327/38; 327/293
(58) Field of Classification Search
None
See application file for complete search history.

(56) References Cited

U.S. PATENT DOCUMENTS

| 2005/0089083 | A1 | 4/2005 | Fisher et al. | |
| 2006/0018369 | A1* | 1/2006 | Sanada et al. | 375/149 |
| 2008/0192877 | A1* | 8/2008 | Eliezer et al. | 375/376 |
| 2011/0085427 | A1* | 4/2011 | Masaki et al. | 369/44.33 |
| 2011/0298520 | A1* | 12/2011 | Masson | 327/337 |

FOREIGN PATENT DOCUMENTS

| EP | 1 903 702 | 3/2008 |
| WO | WO 96/41432 | 12/1996 |
| WO | WO 01/73712 | 10/2001 |
| WO | WO 01/93442 | 12/2001 |
| WO | WO 01/93444 | 12/2001 |
| WO | WO 01/93446 | 12/2001 |
| WO | WO 2006/003294 | 11/2006 |

OTHER PUBLICATIONS

Huang et al., "Timing Tracking Algorithms for Impulse Radio (IR) Based Ultra Wideband (UWB) Systems," 2007 3rd International conference on wireless communications, networking, and mobile computing—WiCOM '07 Sep. 21-25, 2007 Shanghai, China, Sep. 21, 2007, Sep. 25, 2007, pp. 570-573, XP002662469, 2007 3rd International conference on wireless communications, networking, and mobile computing, WiCOM '07 IEEE Piscataway, NJ, USA.

Jin et al., "Periodical-Pilot-Assisted Tracking Loop with RAKE Combining for High Rate DS-UWB Receivers," Communications (ICC), 2010 IEEE International Conference on Communications May 23-27, 2010 Cape Town, South Africa.

* cited by examiner

*Primary Examiner* — Adolf Dsouza
(74) *Attorney, Agent, or Firm* — Occhiuti & Rohlicek LLP

(57) ABSTRACT

A method for integrating signals transmitted from a transmitter to at least one ultra wide band receiver, includes initializing a measurement by estimating an initial clock drift $\Delta DH_{init}$ between said transmitter and said at least one ultra wide band receiver, thereby generating an estimated clock drift, executing an iterative loop, wherein executing said iterative loop comprises integrating at least one received primary signal, said at least one received primary signal composed of at least two samples, wherein integrating said at least one received primary signal comprises a first integration, and at least one of a second integration and a third integration, wherein said first integration uses said estimated clock drift, said second integration uses said estimated clock drift increased by a predetermined value, and said third integration uses said estimated clock drift decreased by a predetermined value, and selecting from among said integrations an integration that maximizes a quality criterion.

21 Claims, 11 Drawing Sheets

METHOD FOR INTEGRATING SIGNALS TRANSMITTED FROM A TRANSMITTER TO AT LEAST ONE ULTRA WIDE BAND (UWB) RECEIVER AS WELL AS DEVICE FOR THE IMPLEMENTATION OF THE METHOD

RELATED APPLICATIONS

Under 35 USC 119, this application claims the benefit of the priority date of French Patent Application 1152844, filed Apr. 1, 2011, the contents of which are herein incorporated by reference.

FIELD OF INVENTION

The present invention relates to a method for integrating signals transmitted from a transmitter to at least one Ultra Wide Band (UWB) receiver as well as to a device for the implementation of the method.

BACKGROUND

The invention lies in the field of Ultra Wide Band (UWB) impulse radio technology, that is to say using signals for which the ratio between the width of the band at 10 dB and the central frequency is greater than 25% and relates more particularly to the correction of the clock drift between a transmitter and a UWB receiver during integration.

This radio technology forms the subject of IEEE standard 802.15.4a.

The applications of this technology are of the personal network and low-speed local wireless networks type, namely: communicating tags, networks of sensors, ADHOC networks (that is to say ones capable of self-organizing with no previously established infrastructure), location of objects, security, etc.

In impulse Ultra Wide Band communication systems, the data sent between a transmitter and a receiver are electromagnetic pulses coded in amplitude, in phase, or in position [cf. "M. Z. Win and R. A. Scholtz, "Impulse radio How it works", IEEE Comm. Letters, vol. 2, no. 2, pp. 36-38, February 1998"]. A critical step of the process of communication between the transmitter and the receiver occurs on reception of the data packets, to determine the instants at which these data packets arrive at the receiver level. Synchronization between the signal received and the receiver is then necessary. This synchronization is all the more difficult to carry out when the medium in which the communication is performed is disturbed (appearance of multipath).

IEEE standard 802.15.4a, which proposes a physical layer of Ultra Wide Band type for low-speed personal wireless networks, imposes new constraints in terms of circuit complexity. Moreover, it proposes the use of data packets having a relatively high duration, associated with particularly strong constraints on clock imperfections. Together, these two aspects require the devising of robust schemes for detecting and correcting clock imperfections. Numerous solutions currently exist that make it possible to perform the synchronization of a receiver with a data packet. A frequently used technique consists of correlating the signal received with a waveform at various instants (cf. patent applications WO 1996-041432, WO 2001-073712, WO 2001-093442, WO 2001-093444, WO 2001-093446, US 2005-0089083 and US 2006-0018369).

The proposed architectures allow very fast synchronization but at the price, however, of very high circuit complexity (the radiofrequency components used are mixers, integrators, local oscillators, etc.).

But this complexity and the cost overhead is not acceptable for certain applications, in particular for location applications, for example for firemen in a smoke-filled environment or for locating avalanche victims (see for example WO2006/003294), therefore a problem arises in respect of the drift of the clocks between the transmitter and the receiver, which will be illustrated in greater detail in what follows.

Indeed, to locate a first transmitter/receiver with respect to a second transmitter/receiver, use is generally made of the measurement of the flight time—or a quantity tied to the flight time—of an electromagnetic pulse of very short duration.

This principle, also called "two ways ranging" (TWR), is illustrated in FIGS. 1 and 2.

FIG. 1 shows a first 1 and a second 2 transmitter/receiver 1, each having its own clock respectively H1 and H2. These clocks are not synchronized.

FIG. 2 shows a timechart of transmission and reception of the signals exchanged between the first 1 and the second 2 transmitter/receiver.

In this exchange of signals, the transmitter/receiver 1 transmits an electromagnetic pulse at the instant $t_0$. Having regard to the velocity of propagation of light c, this pulse will reach the transmitter/receiver 2 at the time $t=t_0+d/c$, where d represents the distance between the transmitter 1 and the receiver 2.

At this juncture, the device 2 could measure the distance d if it knew the precise transmission time $t_0$, but this is not the case since the two devices may not be synchronized precisely because of their clock drifts.

Therefore, after a known duration $\Delta T$, the transmitter/receiver 2 transmits in its turn a pulse that arrives at the level of the device 1 at the time $t=t_0+2d/c+\Delta T$.

In contrast to the transmitter/receiver 2, the transmitter/receiver 1 can actually evaluate the distance, since it knows the instant $t_0$ and the duration $\Delta T$, which is a constant of the system.

The precision with which the times of arrival and hence the distances may be measured is directly related to the duration of the pulse. Typically, the durations of these pulses are on the scale of a nanosecond (during 1 nanosecond, the pulse travels 30 cm). It is moreover known that a pulse that is very narrow in the time domain is very spread in the frequency domain. For this reason radio systems using short pulses are termed Ultra Wide Band (UWB) radio, with reference to their spectral spread.

Because of their large spectral spread (several hundreds of megahertz), these systems are also characterized by a very weak transmission level. Indeed, there is no frequency band allocated exclusively for UWB systems, the latter must therefore use bands reserved for other "conventional" radio systems without, however, disturbing them.

The legislators have therefore fixed standards regarding very low transmission powers (−41.3 dBm/MHz between 3 and 5 GHz for example) to forestall any interference from the UWB system to the "conventional" radio system. Conversely, UWB systems encounter the transmissions of conventional radio systems head on.

The low transmission power on the one hand and the presence of much interference on the other hand imply that UWB systems are limited to applications at low range (typically a few meters). For example, measurements have shown that the range of a pulse in the 500 MHz-1 GHz band of 3 V amplitude was about 3 meters (for isotropic antennas).

However, certain application scenarios, especially location, require much greater ranges, on the order of several tens of meters, for example.

To address the concern not to increase radiation power, increased range may be achieved only through digital processing operations that are all akin to an averaging mechanism.

Indeed, in order to detect a signal, its amplitude must be greater than that of the noise. In practice, the amplitude of the signal should be at least 3 times greater than the standard deviation of the noise, that is to say the signal-to-noise ratio should be at least about 10 dB.

The most effective technique making it possible to reduce noise consists, in principle, in transmitting the same pulse several times at the level of the transmitter and in calculating the average (or the sum) of the signals received at the level of the receiver.

The period T with which a pulse 4 is repeated is called the PRP (Pulse Repetition Period). The receiver will thereafter "chop" the signal received according to this same period before performing the summation as indicated in FIG. 3. This mechanism is also called "integration". The integrated signal 5 is seen schematically in FIG. 3.

The principle underlying the integration mechanism is that the "signal" is summed better than the "noise". To understand this principle, it is necessary firstly to represent a sample digitized by the receiver r(t) as the sum of a "useful signal" (the pulse) s(t) and of noise b(t)

[1]

$$r(t) = s(t) + b(t) \tag{1}$$

Because noise is a random variable, its amplitude is characterized by its standard deviation $\sigma$, which is also defined as the square root of its variance.

The signal-to-noise ratio of the sample r(t) is then given by

[2]

$$SNR(t) = 20 \log\left(\frac{s(t)}{\sigma}\right) \tag{2}$$

The integrated signal $r_m(t)$ is described by

[3]

$$r_m(t) = \sum_{i=0}^{n-1} r(t + iT) \tag{3}$$

In a trivial manner, when an identical signal is added together n times, its amplitude is multiplied by n

[4]

$$s_m(t) = s(t) + s(t+T) + s(t+2T) + \ldots s(t+(n-1)T) = n \cdot s(t) \tag{4}$$

On the other hand, adding a random variable together n times amounts to multiplying its variance by n and therefore its standard deviation by $\sqrt{n}$

[5]

$$\sigma_m^2 = \sigma^2 + \sigma^2 + \sigma^2 + \ldots \sigma^2 = n \cdot \sigma^2 \tag{5}$$

Therefore

[6]

$$\sigma_m = \sqrt{n} \cdot \sigma^2 \tag{6}$$

The signal-to-noise ratio of the integrated signal is therefore improved by a factor $10 \cdot \log(n)$ with respect to the signal-to-noise ratio of the non-integrated signal.

[7]

$$SNR_m(t) = 20 \cdot \log\left(\frac{n \cdot s(t)}{\sqrt{n} \, \sigma}\right) = 10 \cdot \log(n) + SNR(t) \tag{7}$$

In order to spread the transmission spectrum, to convey an item of information or else to distinguish the pulses, the signal sent is not simply periodic but is modulated according to a particular coding. For example, it is possible to modify the position $\tau(i)$ of the pulse in window number i as indicated in FIG. 4.

In this case, the chopping and averaging mechanism described previously would not operate since the pulse is not always "at the same place" in the window of the PRP.

More generally, the received signal can be written:

[8]

$$r(t) = \sum_{i=0}^{n-1} \delta(t + iT + \tau_i) \cdot A_i \cdot p(t) + b(t) \tag{8}$$

With $[\tau_0 \ldots \tau_{n-1}]$=a code of positions with $0 < \tau_i < T$ $[A_0 \ldots A_{n-1}]$=a polarity code with $A_i = \pm 1$ p(t)=a signal describing the fundamental pulse received b(t)=white noise To perform the reception of a coded signal, the signal received is correlated with the expected sequence $\alpha(t)$

[9]

$$\alpha(t) = \sum_{i=o}^{n-1} \delta(t + iT + \tau_i) \cdot A_i \tag{9}$$

From this point of view, the simple summation as illustrated in FIG. 3 may be interpreted as the particular case of a correlation with a Dirac comb.

We obtain the integrated signal

[10]

$$r_m(t) = \int_{-\infty}^{\infty} r(u) \cdot a(u - t) \, du \tag{10}$$

In particular

[11]

$$r_m(0) = \sum_{t=0}^{n-1} A_t^2 \cdot p(0) + \sum_{t=0}^{n-1} A_t \cdot b(t + iT + \tau_t). \tag{11}$$

The signal-to-noise ratio of the integrated signal is by definition the ratio of the expectation to the standard deviation of the integrated signal:

$$SNR(0) = 20\log\left(\frac{E\{r_m(0)\}}{\sqrt{\text{var}\{r_m(0)\}}}\right) \quad (12)$$

$$= 20\log\left(\frac{\sum_{i=0}^{n-1} A_i^2}{\sqrt{\sum_{i=0}^{n-1} |A_i| \cdot \sigma^2}} p(0)\right)$$

$$= 20\log\left(\frac{np(0)\cdot}{\sqrt{n}\,\sigma}\right) = SNR_0 + 10\log(n)$$

The same integration gain is found as in the case of the simple average.

To summarize, there is no basic difference between the calculation of the average of a periodic signal or the reception of a signal coded by correlation from the point of view of the integration gain.

Throughout the following, we will restrict ourselves to the particular case of the integration of a periodic signal, bearing in mind that the same principles apply to the more general case of the reception of a signal coded by correlation.

Referring to FIG. 5, it is considered that the signal received is composed of a succession or train of N PRPs (N being a natural integer), each of the PRPs comprising K samples (K being a natural integer). A sample $x_n^k$ therefore corresponds in this case to sample number k (also called the phase) of PRP number n with k lying between 0 and K−1 and n lying between 0 and N−1. The date of the sample $x_n^k$ is simply

[12]

$$4 \qquad\qquad 1\,3) $$

The integrated signal represented below of the train of N PRPs, and that represents a duration T equal to the PRP, comprises K samples numbered from 0 to K−1. The sample $y_k$ of the integrated signal is therefore simply

[13]

$$y_k = \sum_{n=0}^{N} x_n^k \quad (14)$$

The above formulas have shown that the processing gain obtained by integration increases according to a law of the form 10·log(N), where N is the number of integrations. In order to increase the range of a UWB device it is therefore appropriate to increase the number of integrations, that is to say the number of pulses sent. Precisely, it is shown that to increase the range by a factor α, the number of pulses must be multiplied by $\alpha^2$. In practice, to obtain large ranges, the number of pulses to be integrated quickly becomes very large. For example, having regard to the various losses of the system and the range to be reached (about 100 meters), the number of pulses to be integrated may reach 65,000.

The problem that arises during integration of a very large number of pulses is that, to remain effective, the integration mechanism must add pulses in phase. To understand what this implies, the digitized signal as illustrated in FIG. 6 may be considered. The signal received, a succession of PRPs, possesses for example a periodicity of 1 μs (clock of the transmitter) and, if it is chopped according to the same periodicity by the receiver, the samples represented below having the same phase are aligned. In this case, the summation will be performed perfectly.

On the other hand, when the number of pulses increases, the duration of integration lengthens and the clock drift between the transmitter and the receiver then becomes a very sensitive parameter. For example, if the PRP has a duration of 1 μs, the integration of 65,000 pulses therefore lasts 65000·1 μs=65 milliseconds. To preserve alignment at the level of the sample (that is to say to within 500 picoseconds), the clock drift must be less than

[14]

$$\delta < \frac{500 \text{ ps}}{65000 \times 1 \text{ }\mu s} = 0.007 \text{ ppm} \quad (15)$$

Now, the best quartz crystals on the market have a drift of the order of 1 ppm. In particular, these drifts originate for example from a change of temperature, especially when turned on, the aging of the quartz, mechanical shocks undergone by the quartz or else variations in the quartz supply voltage.

The consequence of integration in the presence of clock drift is presented in FIG. 7. It is noted that in this case, the integrated signal is spread and the integration gain is no longer optimal.

It is therefore understood that the knowledge of the clock drift between the transmitter and the receiver is important in order to be able to increase the range of a UWB system.

A method for estimating the drift between two clocks of a UWB system based on a trellis approach, thereafter allowing coherent integration of the diverse samples received, is known from document EP 1 903 702 A1. According to this approach, partial summations are performed that must all be stored in a memory.

Next, by a multipath-based integration process (see FIG. 11 of this document), a large number of summations is carried out and thereafter compared with each other. The best is thereafter selected via an energy criterion for example.

However, the use of the trellis requires significant hardware resources and a non-negligible amount of a posteriori processing. Indeed, if we use for example 2048 points in the PRP and a maximum shift of ±128 samples for 65,535 PRPs (i.e. 128 different segments), the processing operations are composed of construction of the partial sums: 2048×65535=134 million additions storage of the partial sums: 2048×128=262,000 memory words scan of the trellis: 2048×128×256=67 million additions storage of the results of the scan=256×2048=524,000 words search for the best scan: 524,000 words to be processed Moreover, the operations of scanning the trellis and of searching for the best scan are performed after complete reception of the signal, which may be problematic for real-time processing.

Finally, with the aim of limiting the necessary hardware resources, the search for the drift is not performed over the whole set of phases k but only over a limited number of them. This option provided for in the aforementioned document nonetheless assumes that the transmitter and the receiver have been synchronized previously, that is to say the receiver "knows" in which part of the PRP the pulse lies. Now, this approach is not tenable in systems with very low signal-to-noise ratios since synchronization can only be done after drift estimation. It is not possible to synchronize the signal if the latter has not been correctly integrated (poor signal-to-noise ratio) and it is not possible to integrate a signal correctly if the clock drift between the transmitter and the receiver is not known.

A method associated with a correlation device, making it possible to reduce energy consumption by turning on the receiver solely at the moment at which the pulse enters, is also known from the document "Timing tracking algorithms for impulse radio (IR) based ultra wideband (UWB) systems" (Li Huang et al. 2007 3rd International conference on wireless communications, networking, and mobile computing—WiCOM '07 21-25 Sep. 2007 Shanghai, China, 21 Sep. 2007 (2007-09-21), 25 Sep. 2007 (2007-09-25), pages 570-573, XP002662469, 2007 3rd International conference on wireless communications, networking, and mobile computing, WiCOM '07 IEEE Piscataway, N.J., USA). This method makes it necessary to synchronize the processing of the pulse with its reception. However, even if the synchronization is perfect at the start of the method, the clock drift gives rise to desynchronization between the reception and the processing of the pulse in the course of time.

In order to alleviate this desynchronization, the receiver seeks to find which part of the PRP the pulse is in. For this purpose, the method uses an architecture in which three instants of synchronization are considered in parallel.

In order to improve the signal-to-noise ratio and the performance of the approach, the method requires the insertion of "pilot pulses" into the PRP. The pilot pulses are sampled at the three instants of synchronization. The method thereafter compares the energies contained by the pilot pulses at the three instants of synchronization. The instant of synchronization selected for the processing of the pulse is the one containing the maximum energy.

However the insertion of pilot pulses increases the number of operations required and complicates the method.

SUMMARY

The present invention is aimed at alleviating these aforementioned drawbacks, at least in part by proposing a method for integrating signals transmitted from a transmitter to at least one Ultra Wide Band (UWB) receiver which requires only few hardware resources.

For this purpose, the present invention proposes a method for integrating signals transmitted from a transmitter to at least one Ultra Wide Band receiver, characterized in that
- the measurement is initialized beforehand by estimating an initial clock drift $\Delta\Delta DH_{init}$ between the transmitter and the receiver,
- an iterative loop is carried out during which:
- a step of integrating at least one primary signal received composed of at least two samples is carried out during which at least one first integration is carried out using the estimated clock drift and at least one second and one third integration are carried out respectively increased and decreased by a predetermined value,
- from among the at least three integrations, there is selected that one that maximizes a quality criterion, and, if appropriate, the clock drift is adapted to that corresponding to the integration selected.

According to one or more characteristics of the converter circuit, taken alone or in combination:

During the integration step, for example at least three integrations of a single primary signal received are carried out by using, respectively, the estimated clock drift $\Delta DH_i$, as well as the estimated clock drift respectively increased and decreased by a predetermined value $\Delta DH_i + \delta_1$ and $\Delta DH_i - \delta_2$, $\Delta DH_i$ being the clock drift of loop i, i being a natural number, $\delta_1$ and $\delta_2$ corresponding respectively to elementary predetermined clock drifts, and from among the three integrations is selected that one that maximizes a quality criterion, and, if appropriate, the clock drift $\Delta DH_{i+1}$ is adapted to that corresponding to the integration selected.

According to one aspect, during the initialization step
- at least one primary signal transmitted by the transmitter is received,
- j+1 different integrations are carried out on this primary signal with respectively a clock drift $\Delta DH_j$ lying in a discrete span of clock drifts $\Delta DH_j = \Delta DH + j*\delta$, $\Delta DH$ is a predetermined clock drift value, j being an integer and $\delta$ corresponding to an elementary predetermined clock drift,
- the clock drift that maximizes a quality criterion is selected as initial clock drift $\Delta DH_{init}$.

According to another aspect, during the initialization step:
- a first primary signal transmitted by the transmitter for a lesser duration than a time characteristic of the clock drift of the transmitter and of the receiver is received at the receiver, an integration is carried out on this first primary signal and its time of arrival is measured
- after a time period $\theta$, a second primary signal is received at the receiver for a lesser duration than a time characteristic of the clock drift of the transmitter and of the receiver, an integration is carried out on this second primary signal and its time of arrival is measured
- an estimation of the initial clock drift $\Delta DH_{init}$ is determined by utilizing a difference between the times of arrival.

According to yet another aspect, during the initialization step:
- a first primary signal is transmitted for a lesser duration than a time characteristic of the clock drift of the transmitter and of the receiver,
- it is received and an integration is carried out on this first primary signal,
- after a time period $\theta$, a second primary signal is transmitted for a lesser duration than a time characteristic of the clock drift of the transmitter and of the receiver, this second primary signal is received and an integration is carried out on this second primary signal,
- an interval of initial clock drifts $\Delta\Delta DH_j$ is determined by integration of the first samples and second samples,
- at least one third primary signal transmitted by the transmitter is received,
- j+1 different integrations are carried out on this third signal with respectively a clock drift $\Delta DH$ lying in the determined interval $\Delta DH_j = \Delta DH + j*\delta$, $\Delta DH$ is a predetermined clock drift value, j being a natural number and $\delta$ corresponding to an elementary predetermined clock drift,
- the clock drift that maximizes a quality criterion is selected as initial clock drift $\Delta DH_{init}$.

According to a variant, the elementary predetermined clock drifts are equal.

Provision may, for example, be made for at least one of the two elementary predetermined clock drifts to correspond to a shift of a sample $t_{ech}$ for the duration of integration $T_{integration}$.

According to one embodiment, the integrations are carried out by summing the value of a sample in an assigned memory slot and correction of the clock drift is applied by shifting an address pointer of the memory.

According to another embodiment, the integrations are carried out by correlating the value of a sample in an assigned memory slot and the correction of the clock drift is applied by shifting an address pointer of the memory.

According to one aspect, the integrations are carried out by summing the value of a sample in an assigned memory slot and the correction of the clock drift is applied by shifting the clock of the transmitter.

According to one embodiment the at least three integrations of the primary signal received are carried out in parallel by using, respectively, the estimated clock drift $\Delta DH_i$, as well as the estimated clock drift respectively increased and decreased by a predetermined value $\Delta DH_i+\delta_1$ and $\Delta DH_i-\delta_2$.

As an alternative, at least three integrations of three primary signals received successively are carried out in a sequential manner by using, respectively, an estimated clock drift, as well as this estimated clock drift respectively increased and decreased by a predetermined value.

The quality criterion corresponds, for example, to a criterion or a combination of the criteria chosen from the following group: the signal-to-noise ratio S/N, the amplitude, the energy, or the power.

The subject of the invention is also a device for integrating signals transmitted from a transmitter to at least one Ultra Wide Band receiver, characterized in that it comprises means configured
to initialize the measurement by estimating an initial clock drift $\Delta DH_{init}$ between the transmitter and the receiver,
to carry out an iterative loop during which:
a step of integrating at least one primary signal received composed of at least two samples is carried out during which at least one first integration is carried out using the estimated clock drift and at least one second and one third integration are carried out respectively increased and decreased by a predetermined value, and
from among the at least three integrations is selected that one that maximizes a quality criterion, and, if appropriate, the clock drift is adapted to that corresponding to the integration selected.

According to one or more characteristics of the electronic system, taken alone or in combination, the device comprises, for example, means configured to
carry out at least three integrations of the primary signal received by using respectively the estimated clock drift $\Delta DH_i$, as well as the estimated clock drift respectively increased and decreased by a predetermined value $\Delta DH_i+\delta_1$ and $\Delta DH_i-\delta_2$, $\Delta DH_i$ being the clock drift of loop i, i being a natural number, $\delta_1$ and $\delta_2$ corresponding respectively to elementary predetermined clock drifts, and
select from among the three integrations, that one that maximizes a quality criterion, and if appropriate the clock drift $\Delta DH_{i+1}$ so as to adapt to that corresponding to the integration selected.

These means can furthermore be configured to
receive at least one primary signal transmitted by the transmitter,
carry out on this primary signal j+1 different integrations with respectively a clock drift $\Delta DH_j$ lying in a discrete span of clock drifts $\Delta DH_j = \Delta DH + j \cdot \delta$, $\Delta DH$ being a predetermined clock drift value, j being an integer, and $\delta$ corresponding to an elementary predetermined clock drift, and
select as initial clock drift $\Delta DH_{init}$ that one which maximizes a quality criterion.

According to another aspect, the device comprises at least one memory and is configured to carry out the integrations by summing the value of a sample in an assigned memory slot and to apply the correction of the clock drift by shifting an address pointer of the memory.

BRIEF DESCRIPTION OF THE DRAWINGS

Other advantages and characteristics will become apparent on reading the description of the invention together with the following figures in which.

In all the figures, the same elements are referenced by the same numbers.

DETAILED DESCRIPTION

Figure 1:
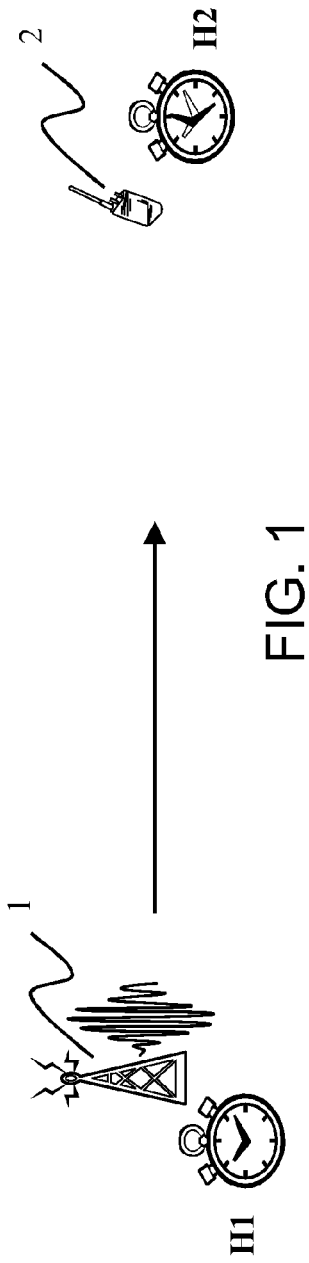
FIG. 1 is an illustrative diagram of a transmitter and of a UWB receiver having unsynchronized clocks.
Figure 2:
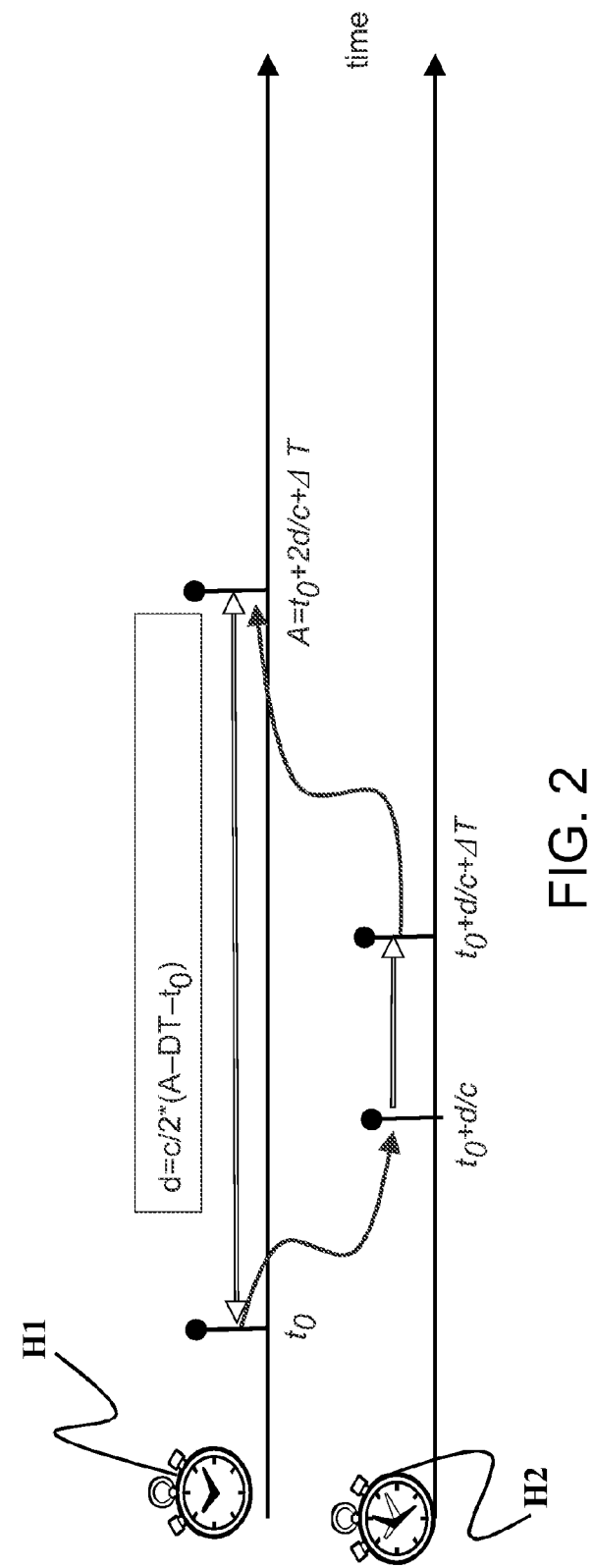
FIG. 2 is a schematic time-chart to illustrate a distance measurement.
Figure 3:
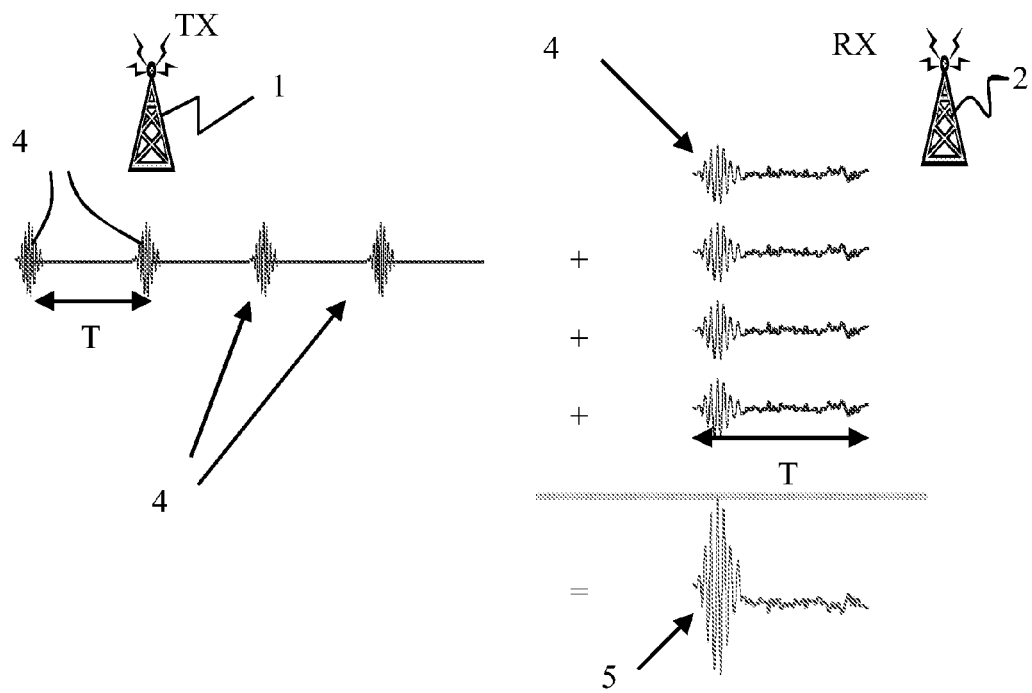
FIG. 3 is a simplified diagram to illustrate the mechanism of signal integration at the level of the receiver.
Figure 4:
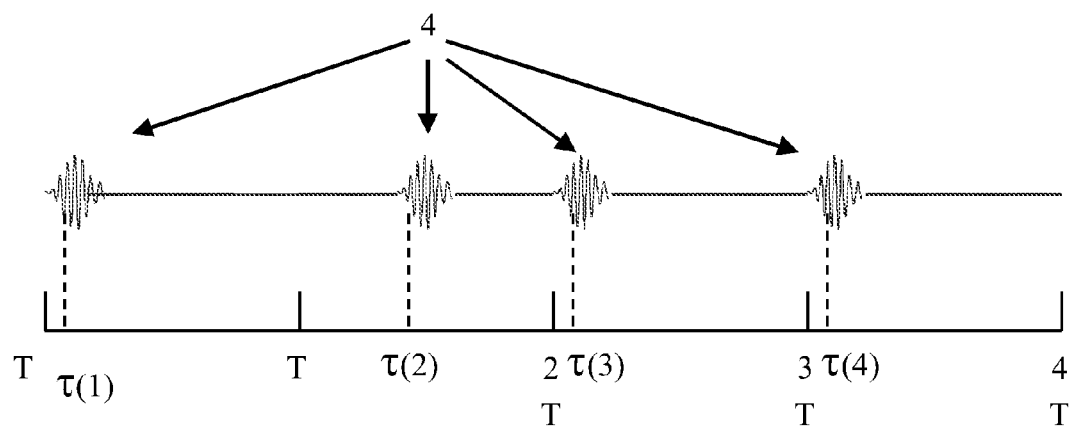
FIG. 4 is a schematic time-chart showing an exemplary position coding of a signal.
Figure 5:
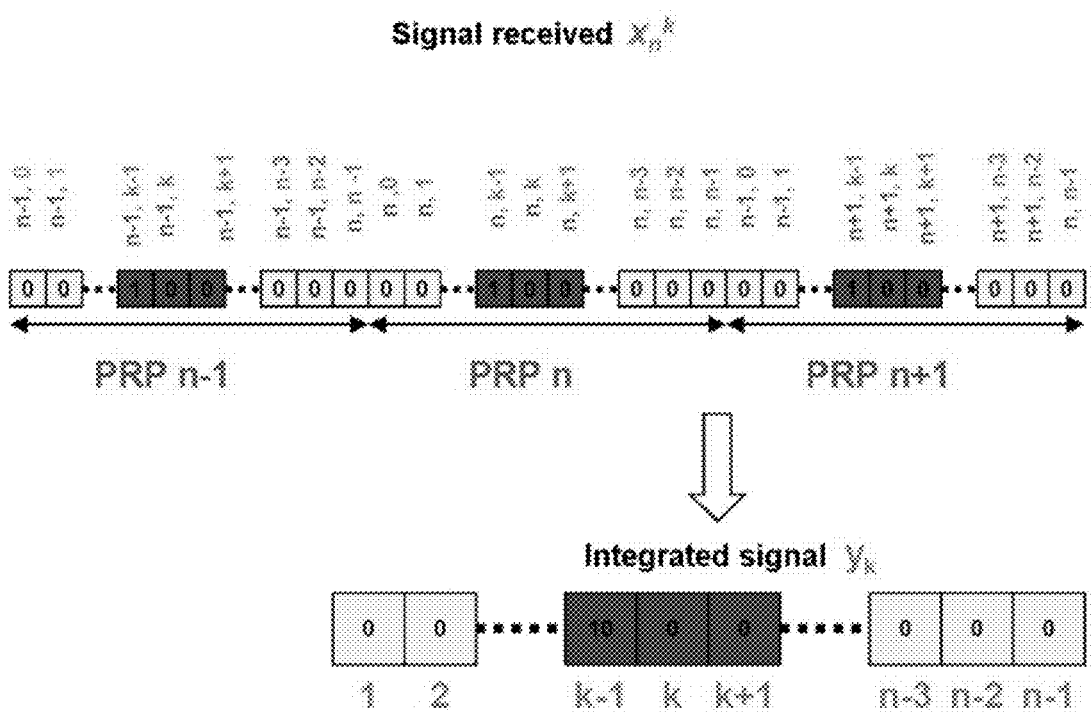
FIG. 5 is an explanatory diagram of the received primary signal of PRPs and of the integrated signal.
Figure 6:
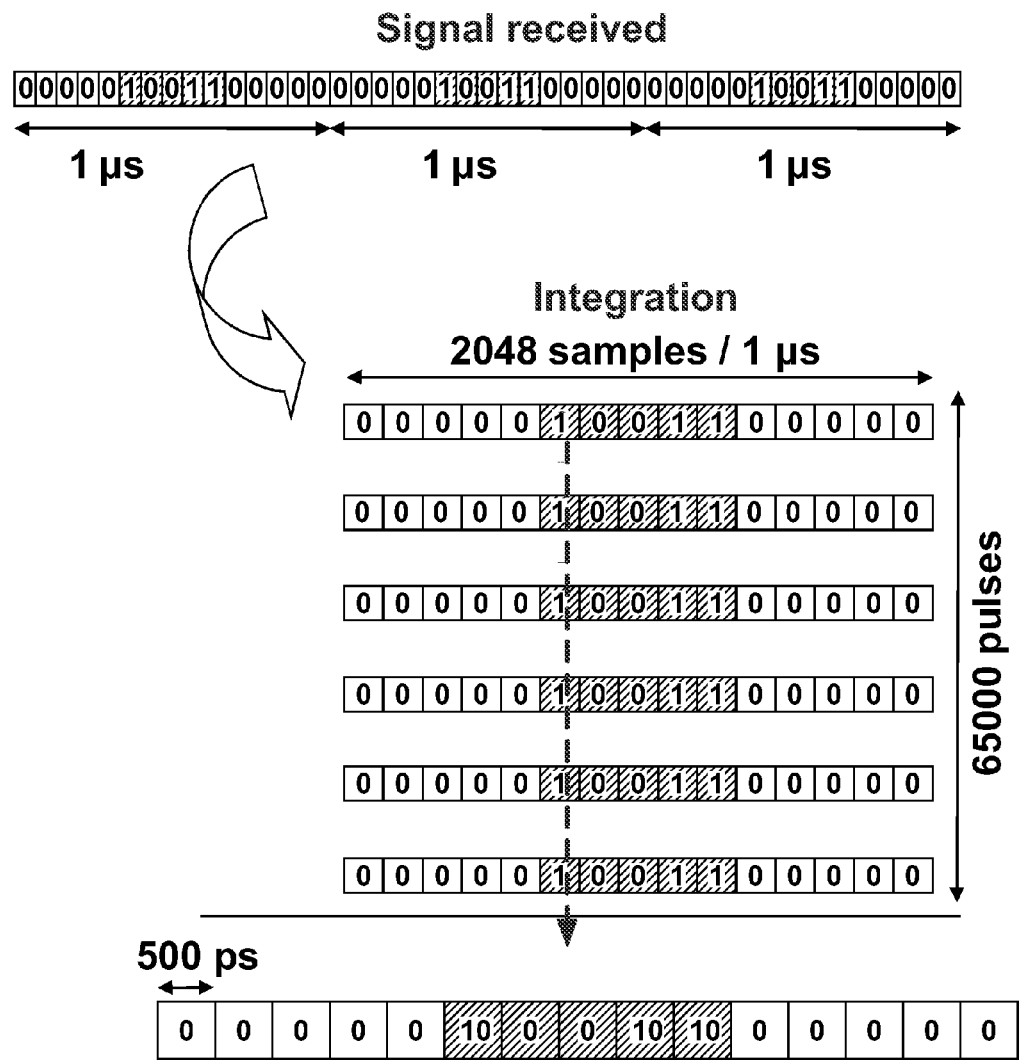
FIG. 6 is an example showing an exemplary integration of a primary signal of PRPs received without clock drift between the transmitter and the receiver.
Figure 7:
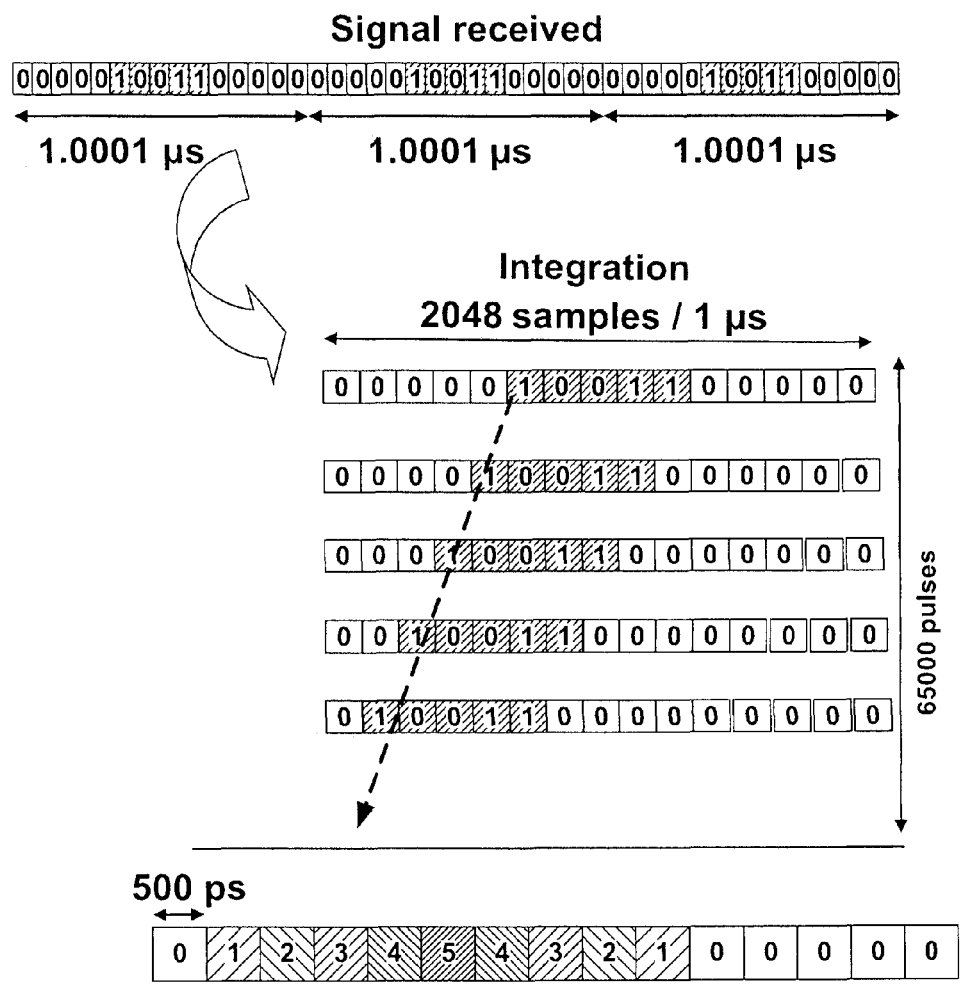
FIG. 7 is an example showing an exemplary integration of a primary signal of PRPs received with clock drift between the transmitter and the receiver.
Figure 8:
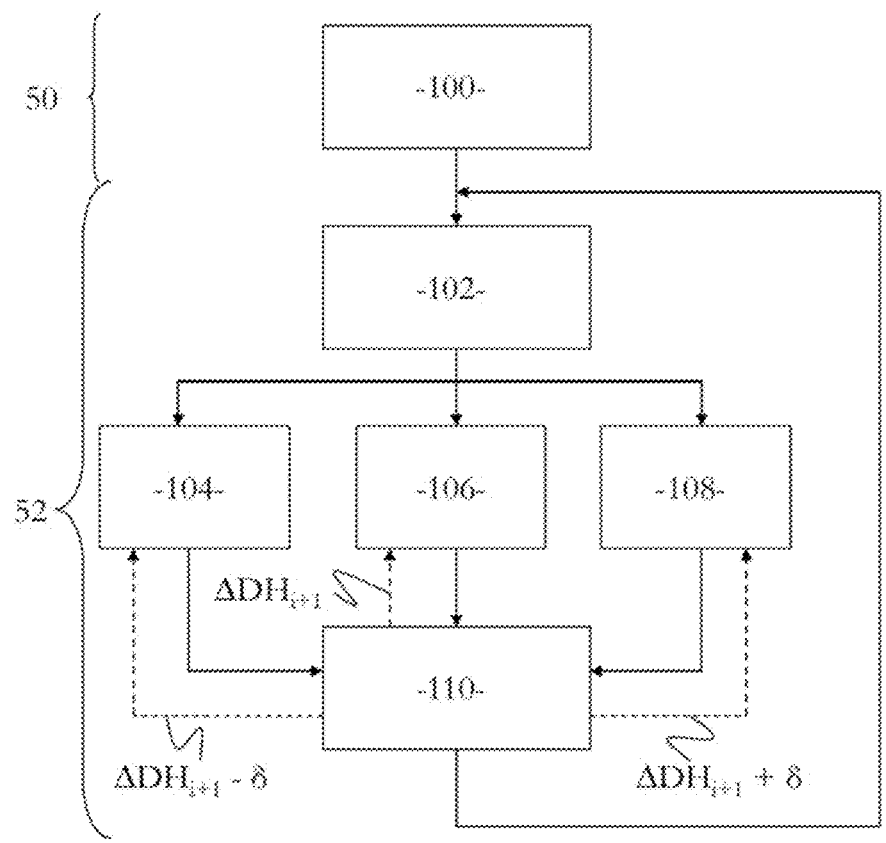
FIG. 8 is a flowchart showing steps of the method according to the invention in general.

FIG. 8 is a flowchart showing steps of the method according to the invention in general.

The method for integrating signals transmitted from a transmitter to at least one Ultra Wide Band (UWB) receiver is essentially composed of two main phases 50 and 52, a first, the initialization phase 50, during which a search is conducted for the value of the clock drift between the transmitter and the receiver, and a second, the tracking phase 52, during which the value of the clock drift, or more exactly, the variation of the clock drift, is tracked so as to correct in real time the clock drift taken into account for the integration, preferably coherent, of a primary signal.

The primary signal is formed of N PRPs each comprising K samples. A sample of the primary signal can therefore be indexed by $x_n^k$, with $0 \leq n \leq N-1$ $0 \leq k \leq K-1$ An integrated signal corresponds, for example, to the average of the signal over the N PRPs or to the correlation of the signal over the N PRPs. The integrated signal is obtained by performing N integrations of the PRPs of the primary signal. It has K samples.

In greater detail, during a first step 100, the measurement is initialized by estimating an initial clock drift $\Delta DH_{init}$ between the transmitter and the receiver.

As will be seen subsequently, this estimation of the initial clock drift $\Delta DH_{init}$ can be done in various ways.

Next, the second phase 52 comprises the realization of an iterative loop with several steps:

During step 102, a primary signal of N PRP's composed of K samples is received, K being a natural number greater than or equal to 1, The receiver is turned on permanently, thus the primary signal is integrated continuously. This makes it possible, on the one hand, to avoid desynchronization between the reception of the primary signal and its processing, and on the other hand, to be able to process the entirety of the primary signal.

Next, during steps 104, 106 and 108, at least three integrations, preferably coherent, of the primary signal received are carried out by using respectively the estimated clock drift $\Delta DH_i$ for step 106, as well as the estimated clock drift respectively increased and decreased by a predetermined value $\Delta DH_i + \delta_1$ for step 104 and $\Delta DH_i - \delta_2$ for step 108. It is possible to use the entirety of the primary signal for each of the integrations. As an alternative, it is also possible to carry out these integrations in a non-coherent manner.

$\Delta DH_i$ is the clock drift of loop i and of course, for i=0, $\Delta DH_0 = \Delta DH_{init}$, i being a natural number.

$\delta_1$ and $\delta_2$ correspond respectively to elementary predetermined clock drifts.

According to one embodiment, the elementary predetermined clock drifts $\delta_1$ and $\delta_2$ are equal to an elementary clock drift $\delta$.

$\delta$ corresponds for example to the drift value producing a shift of a sample $t_{sample}$ for the duration of integration $T_{integration}$:

$\delta = t_{sample}/T_{integration}$

As is shown in FIG. 8, the at least three coherent integrations 104, 106 and 108 are carried out in parallel and simultaneously.

According to a variant, it is possible to carry out these steps 104, 106 and 108 also in a sequential manner, thereby exhibiting, with respect to FIG. 8, the advantage that the integration may be carried out by the same electronic components, therefore requiring still fewer resources.

According to yet another variant, it is possible to carry out steps 104, 106 and 108 on three primary signals received and integrated in a sequential manner. In other words, at least three integrations of three primary signals received successively are carried out in a sequential manner by using, respectively, an estimated clock drift $\Delta DH_i$, as well as this estimated clock drift respectively increased and decreased by a predetermined value $\Delta DH_{i+1} + \delta_1$ and $\Delta DH_{i+2} - \delta_2$.

This also exhibits with respect to FIG. 8 the advantage that the integration may be carried out by the same electronic components, therefore requiring fewer resources.

For the tracking phase 52, three integration steps 104, 106 and 108 have been represented in FIG. 8. However, for example as a function of the clock parameters, or indeed of the environment where the method is implemented, it may be necessary to increase the number of integrations, for example to five in number, with clock drifts $\Delta DH_i + 2\delta$, $\Delta DH_i + \delta$, $\Delta DH_i$, $\Delta DH_i - \delta$ and $\Delta DH_i - 2\delta$.

Next, during step 110, from among the three integrations there is selected that one that maximizes a quality criterion. This quality criterion corresponds, for example, to the signal-to-noise ratio S/N, the amplitude, the energy and/or power, or else a combination of these various parameters. For example, that possessing a maximum of energy is selected and, if appropriate, the clock drift $\Delta DH_{i+1}$ is adapted to that corresponding to the integration selected.

Thus, let us assume that in loop i, the integration of step 104 with $\Delta DH_i - \delta$ has given an integration having for example as quality criterion a maximum of energy with respect to the integrations 106 and 108, then, for the following loop i+1, we choose $\Delta DH_{i+1} = \Delta DH_i - \delta$, so that the integrations of loop i+1 are done with adapted clock drifts, namely for step 104 $\Delta DH_{i+1} - \delta = \Delta DH_i - 2\delta$, for step 106 $\Delta DH_{i+1} = \Delta DH_i - \delta$ and for step 108 with $\Delta DH_{i+1} + \delta = \Delta DH_i$.

It follows from this that the integration can be done in real time with meager resources while taking account of the clock drift between the transmitter and the receiver.

Figure 9:
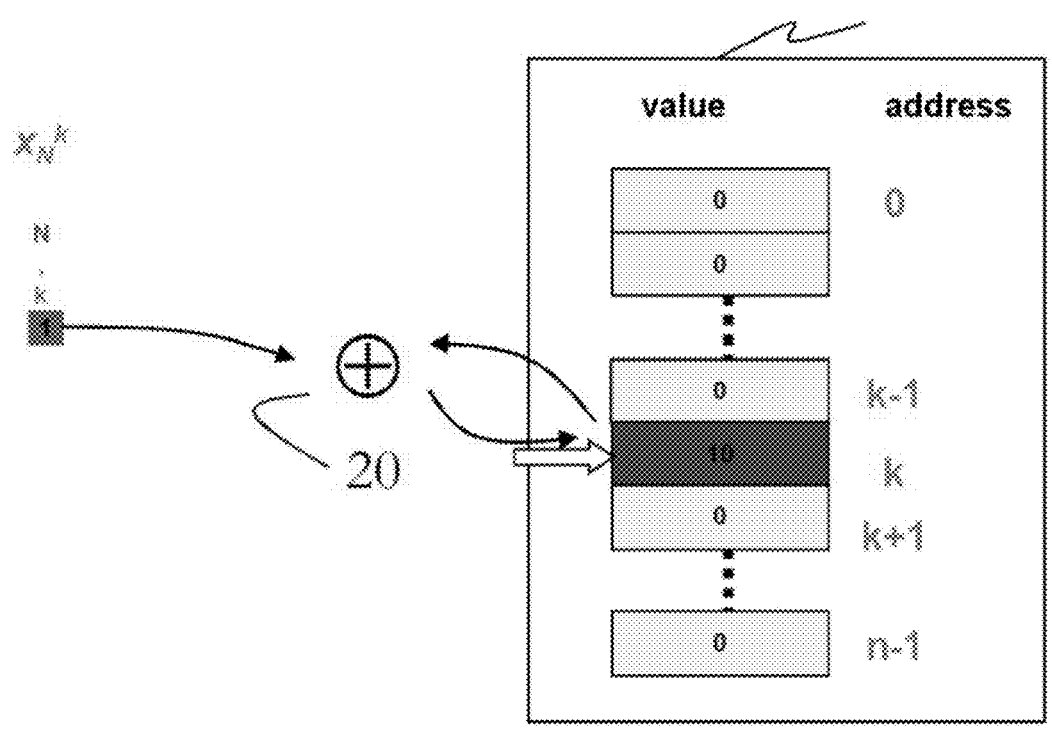
FIG. 9 is a schematic diagram to illustrate a possible embodiment for carrying out the integration of the primary signals of PRPs.

This is represented in FIG. 9, showing an exemplary embodiment of a part of an integration device according to the method described hereinabove.

Represented succinctly therein is a sample k of a signal PRP n, therefore the sample (n,k) according to the definitions set forth hereinabove.

This sample (n,k) is directed by a pointer 20 towards a memory 22 containing the integrated signal $y_k$, and more particularly to the address k.

As may be seen in the figure, in the proposed solution, the signal received is not constructed as partial sums (integrations), stored and post-processed (scan of the trellis) thereafter so as to arrive at the final integrated signal, but the primary signal is fully integrated without involving partial sums and a post-processing step.

The memory 22 contains the result of the integrated signal and the address pointer 20 designates the sample which will be updated.

In the absence of clock drift, the address pointer 20 is incremented for each new sample (n,k).

Figure 10:
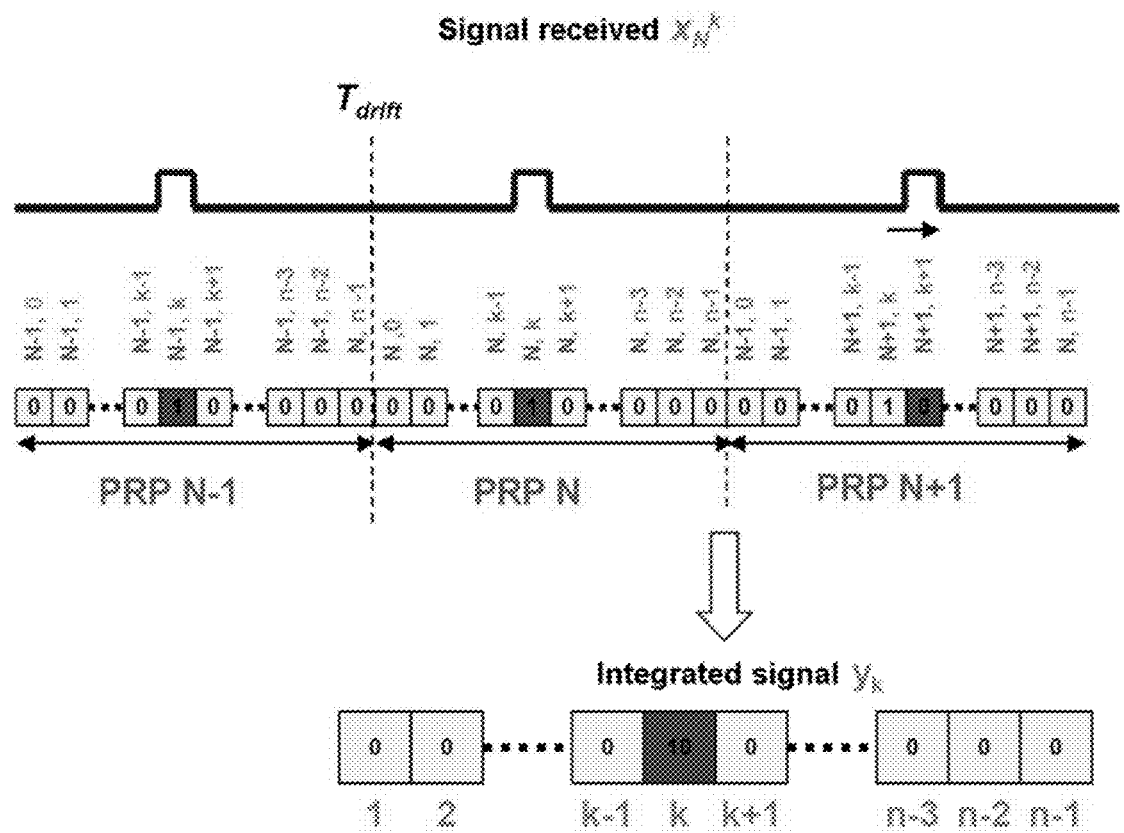
FIG. 10 is an illustrative diagram showing an exemplary integration according to the method according to the invention.

The presence of a clock drift between the transmitter and the receiver causes, after a certain duration $T_{drift}$, the pulse to "slide" from the sample (n,k) to the sample (n,k+1) or (n,k−1) according to the sign of the drift, as illustrated in FIG. 10.

The mechanism for compensating for the clock drift then consists simply in shifting the signal memory address pointer by a value, so that the pointer directs the sample (n,k) to the address k+1 or k−1 of the memory 22 according to the variation in drift noted.

The integrations are therefore carried out by summing the value of a sample (n,k) in an assigned memory slot and the correction of the clock drift is applied by simple shifting of an address pointer of the memory.

If the drift of the clocks is significant, after a new duration $T_{drift}$, another shift will occur so that the address pointer 20 of the signal memory 22 will be shifted by two values etc.

It is therefore understood that by virtue of the method, it is possible to carry out an efficacious integration with few hardware resources, thereby allowing an appreciable increase in the range of the integration device at reduced cost.

According to another variant, it is envisaged that instead of shifting the pointer 20 of the receiver, a control signal be dispatched to the transmitter 1 forcing the latter to shift its clock H1 itself by a clock drift value. Thus, it is possible to carry out the integrations by summing the value of a sample k in an assigned memory slot without forced shifting of the pointer 20.

Figure 11:
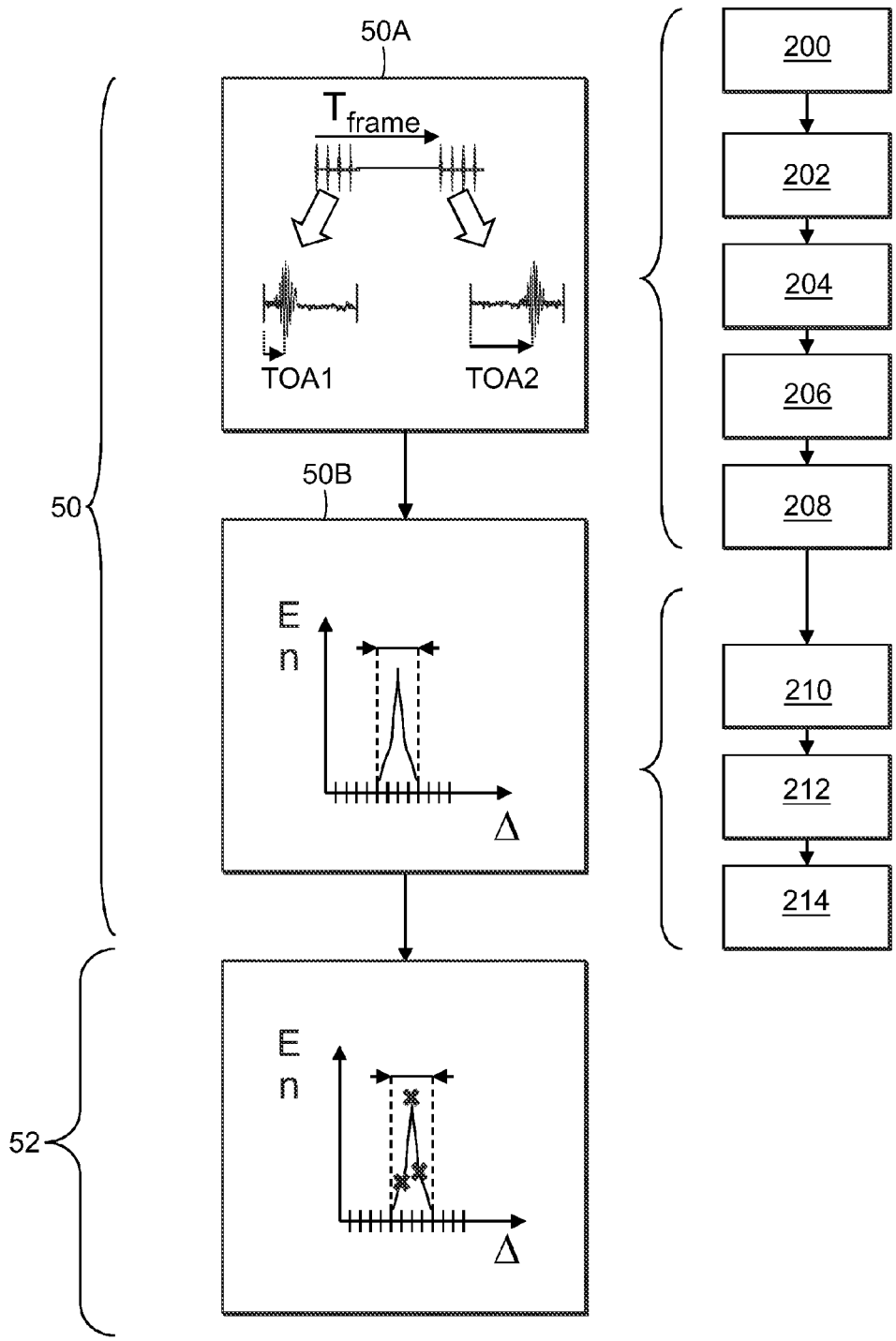
FIG. 11 is a flowchart showing certain steps of the method according to the invention according to a first embodiment.

The initialization phase 50 will subsequently be detailed in conjunction with FIG. 11 according to a first embodiment.

According to this first embodiment, the initialization phase is chopped into two sub-phases 50A and 50B, one of which 50A corresponds to the calculation of the clock drift on the basis of the measurement of the times of arrival of the pulse TOA of two primary signals so as to culminate in a coarse estimation of the clock drift, and the other of which corresponds to a fine analysis of primary signals integrated preferably in a manner that is coherent with various clock drifts in a restricted zone around the coarse estimation.

In greater detail, during step 200, a first primary signal is transmitted for a lesser duration than a time characteristic of the clock drift of the transmitter and of the receiver. Indeed, the latter condition makes it possible to consider that the clock drift during the transmission of the first primary signal is negligible, or even zero.

Next, during a step 202, this primary signal is received and integrated, preferably in a coherent manner, and its time of arrival is measured.

After a time period $\theta$, known to the transmitter and to the receiver, a second primary signal is transmitted during step 204 for a lesser duration than a time characteristic of the clock drift of the transmitter and of the receiver.

Thereafter, during step 206, this second primary signal is received and is integrated, preferably in a coherent manner, and its time of arrival is measured.

During step 208, an interval of initial clock drifts $\Delta DH_j$ is determined by utilizing a difference between these measurements of TOA.

Figure 12:
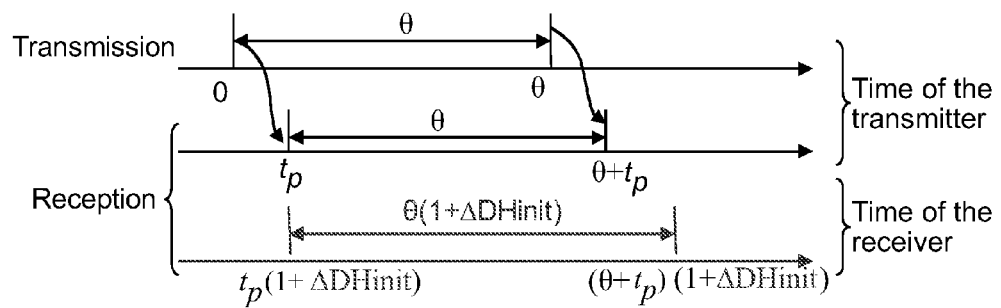
FIG. 12 is an explanatory time-chart to illustrate the estimation of the clock drift between the transmitter and the receiver by a measurement of the time of arrival of a primary signal of PRPs.
Figure 13:
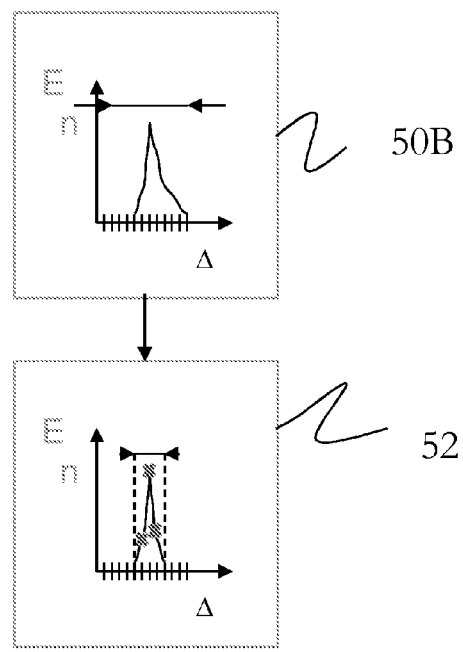
FIG. 13 is a flowchart showing certain steps of the method according to the invention according to a second embodiment.

Indeed, as seen in FIG. 12, this approach utilizes the time of arrival between two successive transmissions $TOA_1$ and $TOA_2$ of the transmitter 1 and assumes that the "nominal" duration $\theta$ between these two transmissions is known to the receiver 2. It also assumes that the transmitter is not too far from the receiver so that, even by using a poor clock drift value, the integrated signal is nevertheless detectable. Practice shows that the latter assumption is generally well satisfied. In this case, the measurement of the two successive times of arrival $TOA_1$ and $TOA_2$ makes it possible to directly calculate the clock drift value or at least an interval of initial clock drifts $\Delta DH$.

To understand this, let us assume that the duration between the two transmissions is equal to $\theta$, that the propagation time between the transmitter 1 and the receiver 2 is equal to $t_p$ and that the clock drift of the receiver with respect to the transmitter is equal to $\Delta DH_{init}$. As shown by FIG. 12, the times of arrival $TOA_1$ and $TOA_2$ measured by the clock of the transmitter are separated by a lag $\theta$. On the other hand, on account of the clock drift, when they are measured by the clock of the receiver, the time noted between the two times of arrival will be "expanded" and will equal $\theta(1+\Delta DH_{init})$. Since the receiver knows the value $\theta$, it can deduce therefrom the drift value $\Delta DH_{init}$.

As a function, in particular, of the quality of the signals received and of the magnitude of the clock drift $\Delta DH_{init}$, either $\Delta DH_{init}$ may be determined directly with enough precision, or we merely culminate in an interval of initial clock drifts $\Delta DH_j$, therefore sum a kind of coarse estimation of the clock drift.

In the latter case, it turns out to be interesting to carry out a fine estimation of the clock drift $\Delta DH_{init}$ inside the interval of initial clock drifts $\Delta DH_j$.

Accordingly, during step 210, a third primary signal transmitted by the transmitter is received.

Next, during step 212, j+1 different integrations are carried out on this third primary signal with respectively a clock drift $\Delta DH_j$ lying in the determined interval $\Delta DH_j = \Delta DH + j*\delta$, j being an integer and $\delta$ corresponding to an elementary predetermined clock drift. $\Delta DH$ is a predetermined clock drift value and in precise case for example the lowest value in an interval of initial clock drifts $\Delta DH_j$.

Finally, during step 214, that one of the $\Delta DH_j$ values corresponding to the integration of the primary signals that maximizes a quality criterion is selected as initial clock drift $\Delta DH_{init}$. This quality criterion corresponds for example to the signal-to-noise ratio S/N, the amplitude, the energy and/or power or else a combination of these various parameters.

Subsequently, the method passes to the tracking phase 52 described hereinabove.

According to a first variant, it is envisaged that the steps of the sub-phase 50A be carried out so as to culminate directly in a value of $\Delta DH_{init}$ without involving the sub-phase 50B, which therefore requires only the measurement of two primary signals and is very fast to carry out.

According to a second variant shown diagrammatically in FIG. 12, an exhaustive search is conducted for the possible/probable drift values $\Delta DH_{init}$, which consists of carrying out the sub-phase 50B in a wider clock drift interval. In this case $\Delta DH$ is any chosen clock drift value, for example equal to zero.

Indeed, given the discrete nature of the acquisitions and of the tolerance of the quartz that serves to construct the clock signals, the possible number of observable drifts is finite. For example, in a system tested by the Applicant, this number was 256. The exhaustive search consists in sequentially testing all the possible clock drift values and in retaining that one that corresponds to the largest metric, that is to say, that one that maximizes a quality criterion. This quality criterion corresponds for example to the signal-to-noise ratio S/N, the amplitude, the energy and/or power or else a combination of these various parameters. For example, it is possible to choose the drift value leading to the largest energy of the integrated signal. This method is akin to a spectral analysis: each drift value tested corresponds to a different repetition frequency. The complete sweep of all the values therefore amounts to plotting the spectrum of a signal.

However, this approach may demand a relatively long time, depending on the number of values to be tested. On the other hand, if the reception device comprises several integration blocks, several values may be tested at the same time for each signal received.

In this case, if a primary signal is transmitted every 256 ms and the receiver comprises three integration blocks. The time required for an exhaustive search is therefore 256 values/3 blocks·256 ms=21.8 seconds.

Figure 14:
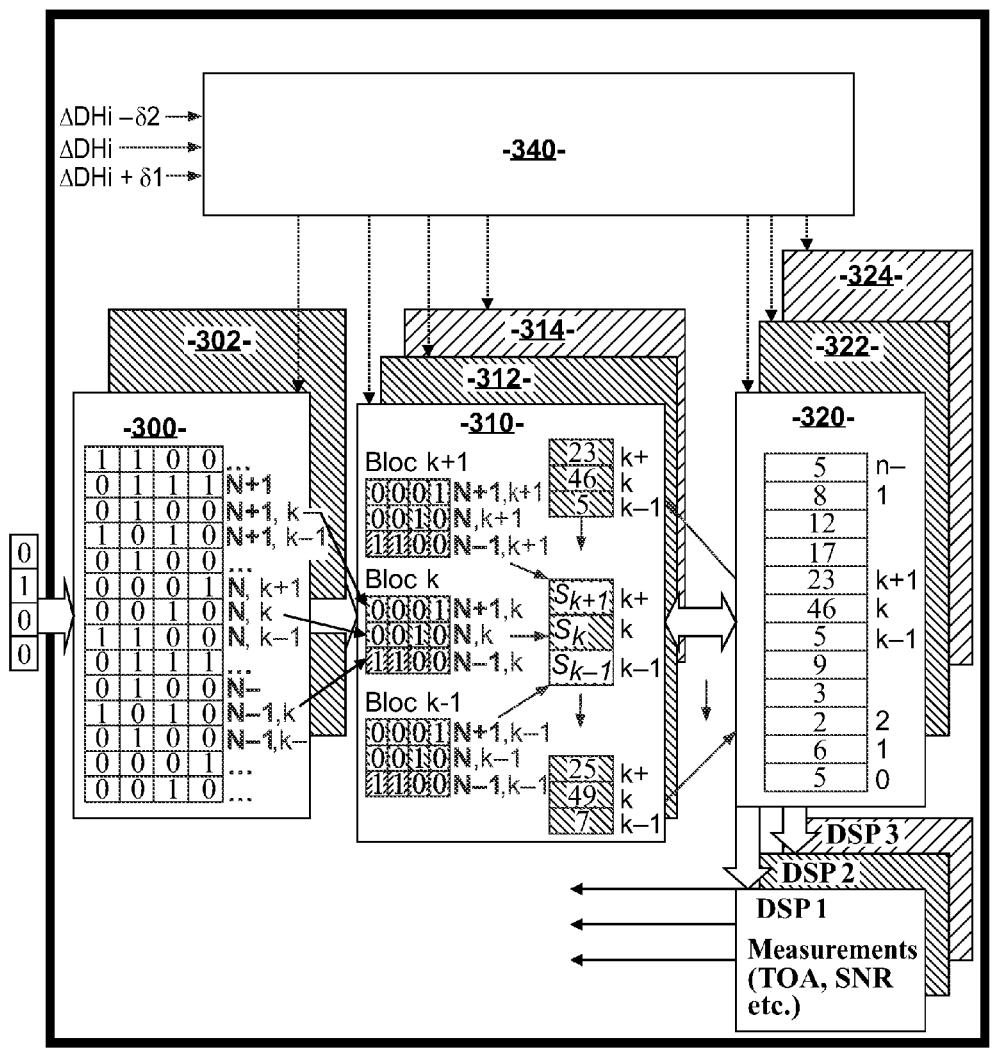
FIG. 14 is a schematic diagram of an example of an integration device for the implementation of the method according to the invention.

FIG. 14 shows a schematic diagram of an exemplary embodiment of a device for integrating signals transmitted from a transmitter to at least one Ultra Wide Band (UWB) receiver for the implementation of the method described hereinabove.

The receiver comprises various blocks.

The primary signals are received and then, for example, digitized on 1 bit. These signals are loaded alternately into two buffer memories 300 and 302, so that when one buffer memory 300, for example, receives digitized signals, the other may be unloaded off to three adders 310, 312 and 314, thereby guaranteeing fast processing. Each buffer memory 300, 302 contains the samples $x_n^k$ of the digitized signal and serves to collect sufficient samples to be able to form blocks.

The role of these memories 300, 302 is to accumulate sufficient samples to have several PRPs available (the number of PRPs stored in buffer memory will be denoted m), with a view to performing operations in parallel on the PRPs.

Blocks of samples are thereafter tapped off from the buffer memory 300 or 302 and loaded off to the three adders 310, 312 and 314.

A block k contains all the samples k of the m PRPs stored in the buffer memory: $[x_N^k \ x_{N+1}^k \ldots x_{N+m-1}^k]$, namely m samples. In total it is m contiguous blocks k that are loaded in parallel towards the adders. The adder does not store these values but calculates the partial sums $S_k$ of each block k as the samples $x_N^k$ are loaded towards the adders 310, 312 and 314. The three adders 310, 312 and 314 are distinguished by the fact of applying respectively the estimated clock drift $\Delta DH_i$, as well as the estimated clock drift respectively increased and decreased by a predetermined value $\Delta DH_i + \delta$ and $\Delta DH_i - \delta$ within the framework of the tracking phase 52 of the method.

In parallel, the m contiguous samples $y_k$ corresponding to the m blocks k are loaded into a signal memory 320, 322 or 324 respectively associated with the adders 310, 312 and 314. Each signal memory 320, 322 or 324 contains the result of the integrated signal and is updated recursively.

Furthermore, the device comprises digital signal processing units DSP1, DSP2, DSP3.

The digital signal processing units DSP1, DSP2, DSP3 carry out the set of functions that process the integrated signal when the integration has terminated. These blocks provide, as output, the useful data relating to the signal integrated, such as the time of arrival of the pulse (TOA), the SNR of the integrated signal, its energy etc. This data is thereafter utilized by a microprocessor (not represented) which calculates the positions of the various beacons.

Finally, a sequencer 340 controls the various blocks and, in particular, generates the addresses of the buffer memories and signal memories.

It is therefore understood that this device is configured to carry out the various steps of the method described hereinabove.

By virtue of the method and of the device according to the invention, it is possible to obtain an optimal processing gain, thereby making it possible, at little expense, to increase the range of the device.

The essence of the processing is performed in real time, thereby allowing very fast availability of results.

The invention claimed is:

1. A method for integrating signals transmitted from a transmitter to at least one ultra wide band receiver, said method comprising: initializing a measurement by estimating an initial clock drift $\Delta DH_{init}$ between said transmitter and said at least one ultra wide band receiver, thereby generating an estimated clock drift, executing an iterative loop, wherein executing said iterative loop comprises integrating at least one received primary signal, said at least one received primary signal composed of at least two samples, wherein integrating said at least one received primary signal comprises a first integration, and at least one of a second integration and a third integration, wherein said first integration uses said estimated clock drift, said second integration uses said estimated clock drift increased by a predetermined value, and said third integration uses said estimated clock drift decreased by a predetermined value, and selecting from among said integrations an integration that maximizes a quality criterion.

2. The method of claim 1, further comprising adapting said clock drift that corresponds to said integration that maximizes said quality criterion.

3. The method of claim 1, wherein said first integration uses said estimated clock drift $\Delta DH_i$, wherein said second integration uses said estimated clock drift increased by a predetermined value, $\Delta DH_i + \delta_1$, and wherein said third integration uses said estimated clock drift decreased by a predetermined value $\Delta DH_i - \delta_2$, wherein $\Delta DH_i$ is a clock drift of loop i, i being a natural number, and wherein $\delta_1$ and $\delta_2$ correspond to elementary predetermined clock drifts.

4. The method of claim 3, further comprising adapting said clock drift that corresponds to said integration that maximizes said quality criterion.

5. The method of claim 1, wherein initializing a measurement comprises receiving said at least one primary signal transmitted by said transmitter, carrying out j+1 different integrations on said primary signal, each integration being carried out with a corresponding clock drift $\Delta DH_j$ lying in a discrete span of clock drifts $\Delta DH_j = \Delta DH + j*\delta$, wherein $\Delta DH$ is a predetermined clock drift value, j is an integer and $\delta$ corresponds to an elementary predetermined clock drift, and selecting said clock drift said maximizes a quality criterion as said initial clock drift $\Delta DH_{init}$.

6. The method of claim 1, further comprising receiving, at said receiver, a first primary signal transmitted by said transmitter for a duration that is less than a time characteristic of said clock drift of said transmitter and of said receiver, carrying out an integration on said first primary signal, measuring said time of arrival thereof, after a time period $\theta$, receiving, at said receiver, a second primary signal for a duration that is less than a time characteristic of said clock drift of said transmitter and of said receiver, carrying out an integration on said second primary signal and measuring a time of arrival thereof, and estimating said initial clock drift by utilizing a difference between said time of arrival of said first primary signal and said time of arrival of said second primary signal.

7. The method of claim 1, wherein initializing a measurement comprises transmitting a first primary signal for a duration that is less than a time characteristic of said clock drift of said transmitter and of said receiver, receiving said transmitted first primary signal, carrying out an integration on said first primary signal, after a time period $\theta$, transmitting a second primary signal for a duration that is less than a time characteristic of said clock drift of said transmitter and of said receiver, receiving said second primary signal, carrying out an integration on said second primary signal, determining an interval of initial clock drifts $\Delta DH_j$ by integrating said a first sample and a second sample, receiving at least one third primary signal transmitted by said transmitter, carrying out j+1 different integrations on said third signal with respectively a clock drift $\Delta DH_j$ lying in said determined interval $\Delta DH_j = \Delta DH + j*\delta$, wherein $\Delta DH$ is a predetermined clock drift value, j is a natural number and $\delta$ corresponds to an elementary predetermined clock drift, and selecting a clock drift that maximizes a quality criterion as said initial clock drift, $\Delta DH_{init}$.

8. The method of claim 3, wherein said elementary predetermined clock drifts are equal.

9. The method of claim 3, wherein at least one of said two elementary predetermined clock drifts ($\delta_1$, $\delta_2$) corresponds to a shift of a sample $t_{ech}$ for said duration of integration $T_{integration}$.

10. The method of claim 1, wherein integrating at least one received primary signal comprises summing a sample value (n, k) in an assigned slot in a memory, said method further comprising correcting clock drift by shifting an address pointer of said memory.

11. The method of claim 1, wherein integrating at least one received primary signal comprises correlating a sample value (n, k) in an assigned slot in a memory, said method further comprising correcting clock drift by shifting an address pointer of said memory.

12. The method claim 1, wherein integrating at least one received primary signal comprises summing a sample value (n, k) in an assigned slot in a memory, said method further comprising correcting clock drift by shifting said clock of said transmitter.

13. The method claim 1, wherein said first, second, and third integrations are carried out in parallel by using respectively said estimated clock drift $\Delta DH_i$, said estimated clock drift increased by a predetermined value, $\Delta DH_i+\delta 1$, and said estimated clock drift decreased by a predetermined value $\Delta DH_i-\delta_2$.

14. The method of claim 1, wherein said first, second, and third integrations are carried out sequentially by using an estimated clock drift ($\Delta DH_i$), said estimated clock drift increased by a predetermined value, $\Delta DH_{i+1}+\delta_1$, and said estimated clock drift decreased by a predetermined value, $\Delta DH_{i+2}-\delta_2$.

15. The method of claim 1, further comprising selecting said quality criterion from said group consisting of signal-to-noise ratio of a power, amplitude of said power, energy of said power, and any combination thereof.

16. An apparatus for integrating signals transmitted from a transmitter to at least one ultra wide band receiver, said apparatus comprising: means for initializing a measurement by estimating an initial clock drift $\Delta DH_{init}$ between said transmitter and a receiver, means for carrying out an iterative loop, said means for carrying out an iterative loop comprising means for integrating at least one received primary signal composed of at least two samples, said means for integrating at least one received primary signal comprising means for carrying out a first integration using an estimated clock drift, means for carrying out a second integration using said estimated clock drift increased by a predetermined value, and means for carrying out a third integration using said estimated clock drift decreased by a predetermined value, said means for carrying out an iterative loop further comprising means for selecting, from among said at least three integrations, an integration that maximizes a quality criterion.

17. The apparatus of claim 16, further comprising means for adapting a clock drift to said integration that maximizes said quality criterion.

18. The apparatus of claim 16, wherein said means for carrying out a first integration comprises means for using said estimated clock drift $\Delta DH_i$, wherein said means for carrying out said second integration comprises means for using said estimated clock drift increased by a predetermined value, $\Delta DH_i+\delta_1$, and said means for carrying out said third integration comprises means for using said estimated clock drift decreased by a predetermined value $\Delta DH_i-\delta_2$, wherein $\Delta DH_i$ is a clock drift of loop i, i being a natural number, $\delta_1$ and $\delta_2$ corresponding respectively to elementary predetermined clock drifts, and means for selecting from among said three integrations an integration that maximizes a quality criterion.

19. The apparatus of claim 16, further comprising means for adapting a clock drift that corresponds to said integration that maximizes said quality criterion.

20. The apparatus of claim 16, further comprising means for receiving at least one primary signal transmitted by said transmitter, means for carrying out, on said at least one primary signal, j+1 different integrations, each with a corresponding clock drift $\Delta DH_j$ lying in a discrete span of clock drifts $\Delta DH_j=\Delta DH+j*\delta$, wherein $\Delta DH$ is a predetermined clock drift value, j is an integer, and $\delta$ corresponds to an elementary predetermined clock drift, and means for selecting, as said initial clock drift $\Delta DH_{init}$, that clock drift that maximizes a quality criterion.

21. The apparatus of claim 16, said apparatus further comprising at least one memory, said apparatus being configured to carry out said integrations by summing said value of a sample in an assigned memory slot of said memory and correct said clock drift by shifting an address pointer of said memory.

* * * * *